Patented Feb. 9, 1932

1,844,016

UNITED STATES PATENT OFFICE

HEINRICH NERESHEIMER, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

PRODUCTION OF NEW VAT DYESTUFFS OF THE ANTHRAQUINONE ACRIDINE SERIES

No Drawing. Application filed October 18, 1929, Serial No. 400,735, and in Germany October 26, 1928.

This invention relates to the production of new vat dyestuffs of the anthraquinone series.

I have found that valuable new vat dyestuffs are obtained from those vat dyestuffs which are obtainable by acting on a 2'-benzanthroyl-1-aminoanthraquinone containing at least one acylamino group with acid condensing agents, by hydrolyzing the acylamino group or groups and then, if so desired, further converting the resulting amino group or groups.

The aforesaid initial materials probably contain the ring system indicated by the following formula:

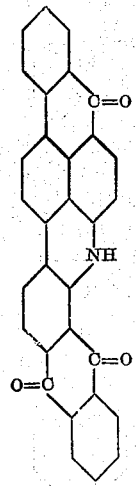

They dissolve in 82 per cent sulfuric acid giving blue to violet colorations and dye cotton bluish green to olive shades from blue to violet hydrosulphite vats.

The aforesaid further conversion of the amino group or groups may consist in the introduction of any desired alkyl, aralkyl or aryl radicles or of acyl groups other than those originally present, or in the replacement of the amino group or groups, by way of the diazonium compounds, by hydrogen or such substituents as halogen atoms, cyano groups or hydroxyl or mercapto groups which may also be etherified. For example, if in the dyestuff obtainable by treatment of 2'-benzanthronyl-1-amino-4-benzoylaminoanthraquinone with an acid condensing agent, which dyestuff corresponds probably to the formula

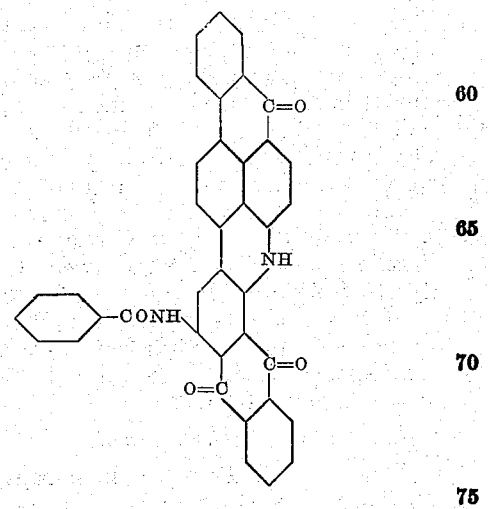

the benzoylamino group be replaced by hydrogen, a vat dyestuff which gives dark green dyeings from a reddish blue vat and which dissolves in concentrated sulfuric acid giving a reddish blue coloration is obtained and this is the fundamental substance of the series.

The new products dissolve in concentrated sulfuric acid giving green to violet colorations and dye cotton various shades from generally blue to violet hydrosulfite vats.

The following examples will further illustrate the nature of this invention, but the invention is not restricted to these examples. The parts are by weight.

Example 1

A solution of 10 parts of the product obtainable by condensation of 2'-benzanthronyl-1-amino-4-acetylaminoanthraquinone or of the corresponding benzoyl compound with aluminium chloride in 100 parts of sulfuric acid of 96 per cent strength is diluted with the same weight of sulfuric acid of 62 per cent strength. The mixture is stirred at a temperature of from 75° to 80° C. until two samples taken from the reaction mass at an interval of 10 minutes have the same appearance when diluted with water. After adding 125 parts of water and allowing the mixture to cool, the precipitated red-violet sulfate of the new dyestuff is filtered off by suction. The dyestuff obtained therefrom is obviously formed from the initial material by elimination of the acetyl or benzoyl radicle. The dyestuff, which dissolves in sulfuric acid of 96 per cent strength giving a pure blue coloration, dyes cotton from a blue vat dark green shades which change to grey when treated with hypochlorite.

A dyestuff which, having in other respects an analogous constitution, contains an amino group in the 5-position instead of in the 4-position gives greenish shades, its derivative substituted by chlorine in the 6-position of the benzanthrone radicle gives bluish grey shades.

In the dyestuffs thus obtained the hydrogen atoms of the amino group may be replaced wholly or in part by organic groups for example by any radicles of mono- or polybasic acids, by alkyl-, aryl-, aralkyl-, anthraquinonyl-radicles and the like by which manner of working dyestuffs of a great variety of shades may be prepared. Thus for example, a vat dyestuff giving grey shades and being fast to chlorine is obtained by condensing the dyestuff, obtainable as described in paragraph 1 of this example, with the trichloranthraquinone-acridone obtainable according to the process described in Example 4 of the German Patent 258,561.

Example 2

The dyestuff described in paragraph 1 of the foregoing example can be converted into the simplest member of the series by the elimination of the amino group. For this purpose it is dissolved for example at room temperature in 20 times the quantity of sulfuric acid of 96 per cent strength and a little more than the calculated amount of nitrosyl sulfuric acid is added thereto. After stirring for a short time the diazotization is completed. The violet solution is poured into 5 times its weight of ethyl alcohol and boiled up; the red violet sulfate of the new dyestuff which separates out is filtered off and decomposed by washing with water. The resulting dyestuff is a black green powder which dissolves in boiling organic solvents giving an emerald green coloration. It is obtained in the form of blue green needles, usually arranged in globular form, from boiling trichlorbenzene. It dissolves in concentrated sulfuric acid giving a reddish blue coloration and dyes cotton dark green shades fast to chlorine from a reddish blue vat.

The amino group of the dyestuff prepared according to Example 1 may also be replaced, by appropriate methods, by other substituents as for example halogen, cyanogen, the hydroxyl or mercapto groups, which may also be etherified, and the dyestuff may also be converted with negatively substituted compounds such as halogen alkyls, halogen or nitro anthraquinones, vat dyestuffs containing halogen and the like and thus a great variety of substituents may be introduced into the amino group.

What I claim is:—

1. The process of producing new vat dyestuffs, which comprises hydrolyzing the acyl amino group in a compound, which contains probably the ring system

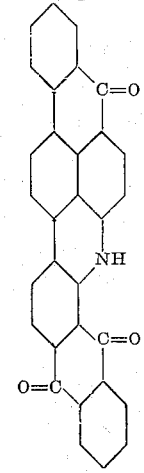

and which contains an acyl amino group.

2. The process of producing new vat dyestuffs, which comprises hydrolyzing the acyl amino group in a compound, which contains probably the ring system

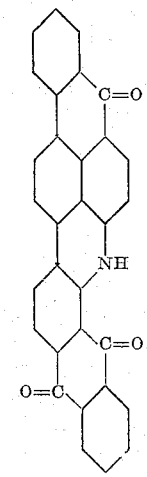

and which contains an acyl amino group, and further replacing the resulting amino group according to usual methods by a member of the group consisting of alkylamino, arylamino, acylamino, diazo, cyano, hydroxyl, mercapto, halogen, and hydrogen.

3. The process of producing new vat dyestuffs, which comprises hydrolyzing the acyl amino group in a compound, which contains probably the ring system

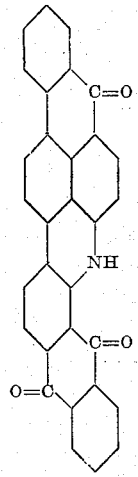

and which contains an acyl amino group, and replacing the amino group by a hydrogen atom by diazotizing the amino group and boiling the diazo compound with alcohol.

4. As new articles of manufacture, the vat dyestuffs which contain probably the ring system

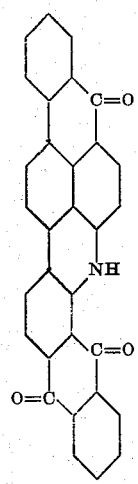

and in which at least one of the ring carbon atoms may contain a substituent of the group consisting of the amino group, the alkyl, aryl and aralkyl amino group, halogen, the cyano group, the hydroxyl and mercapto group and an etherified hydroxy and mercapto group.

5. As a new article of manufacture, the vat dyestuff which probably corresponds to the formula

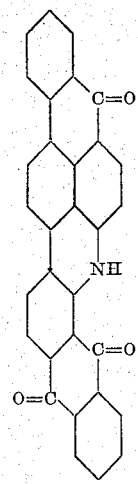

dissolves in concentrated sulfuric acid with a reddish blue coloration and dyes cotton dark green shades fast to chlorine from a reddish blue vat.

In testimony whereof I have hereunto set my hand.

HEINRICH NERESHEIMER.